United States Statutory Invention Registration [19]

[11] Reg. Number: H334

Henry et al. [43] Published: Sep. 1, 1987

[54] OXAZOLE DYES

[75] Inventors: Ronald A. Henry; Aaron N. Fletcher, both of Ridgecrest, Calif.

[73] Assignee: The United States of America as represented by the Secretary of the Navy, Washington, D.C.

[21] Appl. No.: 920,649

[22] Filed: Oct. 20, 1986

[51] Int. Cl.[4] ..... H01S 3/20

[52] U.S. Cl. ..... 372/53; 252/301.17

[56] References Cited

U.S. PATENT DOCUMENTS

| | | | |
|---|---|---|---|
| 3,891,569 | 6/1975 | Schimitschek | 252/301.2 R |
| 3,901,906 | 8/1975 | Kozlik | 260/307 F |
| 4,506,368 | 3/1985 | Lee | 372/53 |

OTHER PUBLICATIONS

Beterov, I. M. et al., Stimulated Emission from 2-phenyl-5(4-difluoromethylsulfophenyl)oxazole pumped with nitrogen laser radiation, (Feb. 1977), v.7, No. 2, p. 246.

Lee, L. et al., Water Soluble Blue-Green Lasing Dyes for Flashlamp-Pumped Dye Lasers v. QE-16, No. 7, pp. 777-784 (Jul. 1980).

Ott, D. G. et al., Oxazole Quaternary Salts, v. 78, pp. 1941-1944, (May 1956).

*Primary Examiner*—John F. Terapane
*Assistant Examiner*—Susan Wolffe
*Attorney, Agent, or Firm*—W. Thom Skeer; Stephen J. Church

[57] ABSTRACT

Oxazole dyes and certain quaternary salts of these compounds having a formula as follows:

R = F and Cl

X = $ClO_4^-$, $BF_4^-$ and $H_3C$  $SO_3^-$ are useful as visible-wavelength lasing dyes. These dyes are useful in solution with non-interferring polar solvents, such as low molecular weight alcohols, $H_2O$ and mixtures thereof, to form lasing media useful in dye lasers.

4 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

R = F and Cl

R = F and Cl

X = $ClO_4^-$, $BF_4^-$ and $H_3C$  $SO_3^-$

OXAZOLE DYES

BACKGROUND OF THE INVENTION

1. Field of the Invention

This invention relates to lasers and more particularly to organic dye lasers. Even more particularly, this invention relates to oxazole dyes and certain quaternary salts of those compounds used in solution with non-interferring polar solvents to form lasing media useful in organic dye lasers 2. Description of the Prior Art Many laser dyes lase effectively in organic solvents but become poor or ineffective in water or organic solvents containing large amounts of water even though the dye itself is water soluble. Water is a preferred solvent because it is not flammable and because it has excellent thermooptical properties. Certain modifications of the molecular structure of the laser dye can produce somewhat predictable changes in lasing performance. However, it is extremely difficult to incorporate all of the desired properties into a single laser dye. One particular problem is that organic molecules in aqueous solution have a tendency to form dimers and higher aggregates which have a distinctly different absorption spectrum from the monomer. In most cases, the fluorescence of the dimers is completely quenched and cannot be observed. Adding to this problem is that the equilibrium between monomers and dimers shifts to the dimers with increasing dye concentration and with decreasing temperature. It is possible to suppress the aggregation of dyes in aqueous solutions by adding surfactants. However, because of the large amounts that are needed, the lasing properties of such solutions are not always favorable.

Certain oxazole dyes are well-known as stable, long-lived laser dyes that lase in water and aqueous solutions. The quaternary salts of 2-(4-pyridyl)-5-aryloxazoles are known to be useful as visible wavelength lasing dyes when used with non-interferring polar solvents such as low molecular weight alcohols and water. These dyes generally have good photochemical stability and lase in the 500–600 nm region. Previous investigations into laser dyes that lase in the blue-green region of the spectrum suggest some possible means of shifting the untuned lasing maximum to shorter wavelengths. Some methods discussed by L. Lee et al. in *Water Soluble Blue-Green Lasing Dyes for Flashlamp-Pumped Dye Lasers,* IEEE Journal of Quantum Electronics, vol. QE-16, no. 7 (July 1980) include decreasing the concentration of the dye, lowering the temperature of the dye solution, using in the 2-position of the oxazole ring a 3-pyridyl group rather than a 4-pyridyl group, and replacing the CH group in the oxazole ring with a nitrogen atom to give a 1,3,4-oxadiazole ring system. It was also suggested that improvements to output and stability could be made by adding or changing groups to the 4-position of the oxazole ring and /or the pyridinium nitrogen atom.

In contrast, the present invention provides high-output long-lived dyes produced by other means. Halide groups and methoxy groups were added to the 4-position of the phenyl group at the 5-position of the oxazole ring. 2-(4-pyridyl)-5-(4-halophenyl) oxazoles and 2-(4-pyridyl)-5-(4-methoxyphenyl) oxazoles and their quaternary salts were prepared. Changes in the electronegativity of the group at the 4-position of the 5-phenyl ring were expected to affect the lasing wavelength. It was not expected that these changes would affect the lasing output or dye stability. The fluoro derivative was found to have good photochemical stability. Quite unexpectedly, this derivative was found to have a lasing output about 300% greater than the previous pyridyl phenyl oxazole dyes. It should be noted that the laser dyes of the present invention respond well to flashlamp pumping and the lasing data provided in Tables 1–3 resulted from dyes that were flashlamp pumped.

SUMMARY OF THE INVENTION

One object of this invention is to provide novel oxazole laser dyes which have good photochemical stability and high lasing output.

Another object of this invention is to provide dye lasers which lase in the blue-green wavelength region when using lasing media prepared from novel oxazole dyes and aqueous solutions or water.

According to the present invention, 2-(4-pyridyl)-5-phenyl oxazoles are prepared with halide groups and methoxy groups added to the 4-position of the phenyl at the 5-position of the oxazole ring. These compounds have the formula shown in FIG. 1. Certain quaternary salts of these compounds are also useful, having the formula shown in FIG. 2.

These compounds are dissolved in a non-interferring polar solvent to form lasing media useful in dye lasers. The dye laser comprises a laser dye solution or lasing media and a pumping energy source operably coupled therewith and capable of producing stimulated emission of the lasing media.

DETAILED DESCRIPTION OF THE INVENTION

Figure 1:
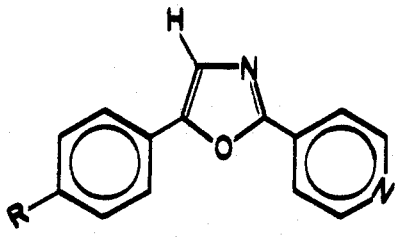
FIG. 1 shows the structures of the 2-(4-pyridy)-5-(4-"x"-phenyl) oxazole derivatives.
Figure 2:
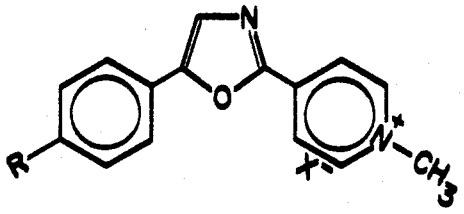
FIG. 2 shows the structures of the 4-{2-(5-[4-"x"-phenyl]oxazolyl)}-1-methylpyridinium quaternary salt derivatives.
Figure 2:
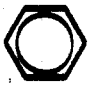

The pyridyl 4-halophenyl oxazoles, pyridyl 4-methoxy phenyl oxazoles and their quaternary salts of the present invention are prepared from the respective halogen substituted acetophenones and methoxy substituted acetophenones by procedures which are similar to those reported by D. G. Ott, F. N. Hayes and V. N. Kerr, *Oxazole Quaternary Salts,* J. Amer. Chem. Soc., 78, (1956) pp. 1941–1944. A general procedure for preparing the pyridyl halophenyl oxazole derivatives from the halogen substituted acetophenone has several steps. First, the alpha-chloro or bromo substituted acetophenone is reacted with hexamine in chloroform. The resulting salt which precipitates is recovered and hydrolyzed to the 4-substituted phenacylamine hydrochloride in methanolic hydrochloric acid. The latter salt is reacted with isonicotinic acid chloride in dry pyridine to form the intermediate amide. The solid amide is then mixed with phosphoryl chloride and refluxed. The resulting residue is then dissolved in a low molecular weight alcohol and made basic. Part of the solid phase was separated and recrystallized using a cyolohexane-benzene solution to obtain the specific oxazole. The examples of the present disclosure will provide more specific details of synthetic procedures that may be used to prepare compounds having the structures shown in FIG. 1 and FIG. 2.

Conventional liquid laser apparatus may be used with the lasing media of the present invention. More specific details of the liquid laser apparatus is provided in the examples. A particularly important feature of the invention is the large unexpected increase in laser output using the novel dyes. The output of a flashlamp pumped dye laser can be described by the following equation:

$$\phi = k(I - t)$$

where k is called the slope efficiency, I is the electrical input energy stored in a capacitor prior to discharge through the flashlamp, and t is the threshold of lasing. The slope efficiency and threshold of lasing were measured for the novel dyes and found to be significantly improved over other reported pyridyl substituted oxazole salts. That is, an increase in the lasing slope efficiency and a decrease in the lasing threshold results in a large output. See TABLE 1.

The following examples are given to illustrate but not limit the invention.

EXAMPLE 1

2-(4-Puridyl)-5-(4-fluorophenyl) oxazole

Hexamine (20.4 g, 0.146 mole) was dissolved in 500 ml of chloroform and treated with 25 g (0.145 mole) of alpha-chloro-4-fluoroacetophenone in 500 ml of chloroform. After 40 hours at room temperature the mass of white, felted needles which had crystallized was filtered, washed twice with chloroform and dried resulting in 43.0 g of material with a mp of 130°–135° C.

All of this salt was dissolved in 480 ml of methanol and the solution cooled in an ice-water bath before adding portion-wise 66 ml of concentrated HCl. After standing at ambient temperatures for 17 days, the precipitated ammonium salts were filtered off and washed twice with cold ethanol. The combined filtrate and washings were taken to dryness on a rotary evaporator at 25° C. The residue was slurried with 50 ml of ice-water and the slurry cooled to 5° C. The alpha-amino-4-fluoroacetophenone hydrochloride was filtered, washed twice with ice-water and dried to give 13.8 g of material (53% yield) having a mp 236°–239° C.

Isonicotinic acid (14.0 g, 20% excess) was converted to the acid chloride with 55 ml of thionyl chloride in the usual manner. To this was added 17.6 g of vacuum dried alpha-amino-4-fluoroacetophenone hydrochloride, then 170 ml of dry pyridine. The slurry was stirred under a drying tube for 92 hours. Then the pyridine was removed on a rotary evaporator at pump limit. The dark, gummy residue was slurried in 150 ml of 50% aqueous ethanol, made basic by carefully adding solid sodium carbonate, then diluted with 200 ml of water. The orange-colored solid was filtered, washed several times with water and dried to give 18.7 g of material having a mp of 167°–172° C. This amide can be recrystallized from benzene, but in general it was sufficiently pure for the next step.

Oven dried amide (3.6 g) and phosphorus oxychloride (phosphoryl chloride) (35 ml) were refluxed with stirring for 16 hours to produce a homogeneous solution. After cooling, the excess acid chloride was removed at reduced pressure. The black residue was dissolved in 50 ml of 80% aqueous ethanol and made basic with 10% aqueous sodium hydroxide. A black tar (0.4 g) separated first, followed by a tan flocculent solid. The latter was filtered, washed well with water and dried to produce 2.4 g of material. All of this material was recrystallized from 100 ml of 6:4 cyclohexane-benzene with charcoal decolorization. The first material to crystallize proved to be 2,5-bis(4-fluorophenyl) pyrazine. After recrystallization from dimethlysulfoxide, the material had a mp 231.5°–232.5° C. Elemental analysis for 2,5-bis(4-fluorophenyl) pyrazine $C_{16}H_9F_2N_2$. Calculated: C, 71.83., H, 3.78; F, 14.17; N, 10.44. Found: C, 71.55; H, 8.85; F, 14.07; N, 10.39.

The 2-(4-pyridyl)-5-(4-fluorophenyl) oxazole crystallized last and melted at 152°–153° C. Elemental analysis for $C_{14}H_9FN_2O$ is as follows. Calculated: C, 69.99; H, 3.78; N, 11.66. Found: C, 70.10; H, 3.84; N, 11.56.

The fluorescence maximum for the oxazole in a variety of solvents was determined. In ethanol, the fluorescence maximum was 394 nm when the dye was excited at 318 nm. In 50% aqueous ethanol, the fluorescence maximum was 396 nm when the dye was excited at 322 nm. In 0.5M perchloric acid in ethanol, the fluorescence maximum was 480 nm when the dye was excited at 372 nm.

EXAMPLE 2

4-{2-(5-[4-Fluorophenyl]-oxazolyl)}-1-methylpyridinium p-toluenesulfonate

The procedures of Example 1 were followed to produce the 2-(4-pyridyl)-5-(4-fluorophenyl) oxazole. This compound was quaternized by refluxing with methyl p-toluenesulfonate in dry acetonitrile for 7 hours. The resulting salt had fluffy, yellow needles. Recrystallization from 2-propanol with charcoal decolorization produced material that melted at 229.5°–231.5° C.

Elemental analysis for $C_{22}H_{19}FN_2O_4S$ is as follows. Calculated: C, 61.98; H, 4.49; N, 6.57. Found: C, 61.86; H, 4.58; N, 6.51.

The fluorescence maximum for the quaternary salt in a variety of solvents was determined. In ethanol, the fluorescence maximum was 486 nm when the dye was excited at 378 nm. In 50% aqueous ethanol, the fluorescence maximum was 486 nm when the dye was excited at 376 nm.

Preparation of perchlorate ($ClO_4$-) and tetrafluoroborate ($BF_4$-) quaternary salts from the fluorophenyl oxazolyl methylpyridinium tosylate involves a simple metathetical reaction in which the tosylate group is replaced with the other anions. The fluorophenyl oxazolyl methylpyridinium tosylate was dissolved in methanol or a 50% aqueous methanol solution but other suitable low molecular weight alcohols may be used. Next, a stoichiometric amount of the anion was added in the form of its respective sodium salt. The reaction was very rapid and practically quantitative. The desired quaternary salt precipitated immediately and was removed by filtration. The compound 4-{2-(5-[4-fluorophenyl]-oxazolyl)}-1-methylpyridinium perchlorate was produced by this procedure. The compound 4-{2-(5-[4-fluorophenyl]-oxazolyl)}-1-methylpyridinium tetrafluoroborate can be produced by this procedure.

EXAMPLE 3

4-{2-(5-[4-Chlorophenyl]-oxazolyl)}-1-methylpyridinium p-toluenesulfonate

Following the procedures of Examples 1 and 2, the compound 4-{2-(5-[4-chlorophenyl]-oxazolyl)}-1-methylpyridinium p-toluenesulfonate was synthesized. When recrystallized from 2-propanol, the material had a melting point of 230°–231.5° C. Elemental analysis for $C_{22}H_{19}ClN_2O_4S$ is as follows. Calculated: C, 59.66; H, 4.32; N, 6.33. Found: C, 59.67, H, 4.41; N, 6.28. The fluorescence maximum for the compound was also determined. The fluorescence maximum was 486 nm when the dye was excited at 376 nm in ethanol.

EXAMPLE 4

5-(4-Methoxyphenyl)-2-(4-pyridyl) oxazole

Following the procedure of Example 1, the methoxyphenyl oxazole was prepared. A chromatographed sample melted at 111°–112.5° C. The material may be recrystallized from cyclohexane with carbon decolorization. Elemental analysis for $C_{15}H_{12}N_2O_2$ is as follows. Calculated: C, 71.42; H, 4.80; N, 11.10. Found: C, 71.38; H, 4.91; N, 10.95.

EXAMPLE 5

4-{2-(5-[4-Methoxyphenyl]-oxazolyl)}-1-methylpyridinium p-toluenesulfonate 5-(4-Methoxyphenyl)-2-(4-pyridyl)oxazole (2.5 g, 0.01 mole), 2.3 g (0.0123 mole) of methyl p-toluenesulfonate and 50 ml of theylene dichloride were refluxed with stirring for 7 hours. When seeded the solution filled with a mass of bright yellow crystals. After standing overnight at 25° C., the salt was filtered, washed twice with 10 ml of 1:1 ethylene dichloride-ether, then 20 ml of ether; to produce 2.9 g of material (66% yield). Recrystallization from 150 ml of 2-propanol with charcoal decolorization yielded the monohydrate which melted at 192°–193° C. The salt can also be recrystallized from a large volume of ethylene dichloride with carbon decolorization to produce light yellow, felted needles having a melting point of 195°–197° C.

Elemental analysis for $C_{23}H_{22}N_2O_5S$ $H_2O$ recrystallized from 2-propanol is as follows. Calculated: C, 60.52; H, 5.30; N, 6.14. Found: C, 61.09; H, 5.31; N, 6.18. The analysis was repeated to show C, 60.87; and H, 5.44.

The fluorescence maximum for the methoxyphenyl oxazolyl pyridinium quaternary salt was determined. The fluorescence maximum was 572 nm in ethanol when the sample was excited at 412 nm.

EXAMPLE 6

Solutions of 4-{2-(5-[4-fluorophenyl]-oxazolyl)}-methylpyridinium p-toluenesulfonate in a variety of non-interferring solvents were prepared having an absorbance of 4 to 6 $cm^{-1}$. These solutions were then flashlamp pumped to provide data on the performance of the laser dye. In the procedure, a Phase-R DL-10Y triaxial flashtube was used. Emission from 400–700 nm of this flashlamp has a 10–90% risetime of about 200 ns. Pyrex glass was used in place of the usual quartz tube to separate the dye solution from the coolant. Separate stainless steel heat exchangers were used to temper the dye solution and water was used as the coolant. The temperatures of these liquids were controlled to 0.01° C. measured at their exit from the flashtube. A Laser Precision Rj-700 series microprocessor based pyroelectric energy meter was used to measure the output energy of the laser.

A Xenon Corp. N-851C water-cooled linear flashlamp was used at rates up to 25 Hz to degrade the dye solution. Water was held between the outside wall of the flashlamp and the inside wall of the jacket in order to reduce reflection losses. The degradation lamp was located so that it receives dye solution from the laser head before it enters the dye reservoir. Part of the dye solution was pumped to a 90 mm millipore fluid filter was diverted back to the reservoir. This bypass continuously removed any bubbles from the filter and produced a vigorous mixing action in the dye reservoir.

Table 1 shows results of tests with 4-{2-(5-[4-fluorophenyl]-oxazolyl)}-1-methylpyridinium p-toluenesulfonate using a variety of solvents and cover gases. Table 2 shows results of tests with 4-{2-(5-[4-chlorophenyl]oxazolyl)}-1-methylpyridinium p-toluenesulfonate. Table 3 shows results of tests with 4-{2-(5-[4-methoxyphenyl]-oxazolyl)}-1-methylpyridinium p-toluenesulfonate. The tables provide lasing characteristics such as lasing slope efficiency, lasing lifetime constant and lasing threshold are given.

The solutions of Tables 2 and 3 were also prepared having an absorbance of about 4 to 6 $cm^{-1}$. Solutions containing about $10^{-5}$ to about $10^{-1}$ molar concentration of dye will also work but may require nitrogen laser pumping. Solutions having an absorbance of about 4 to 6 $cm^{-1}$ are preferred for flashlamp pumping.

Obviously, many modifications and variations of the present invention are possible. It should be understood that, within the scope of the appended claims, the invention may be practiced otherwise than as specifically described.

TABLE 1

LASING DATA FOR 4-{2-(5-[4-FLUOROPHENYL]}OXAZOYL)-1-METHYLPYRIDINIUM P—TOLUENESULFONATE

| SOLVENT | COVER GAS | LASING SLOPE EFFICIENCY $k_o \times 10^3$ | LASING THRESHOLD $t_O$(J) | LIFETIME CONSTANT 1/c (MJ/L) | FIGURE OF MERIT (KJ/L) | LASING WAVELENGTHS (nm) |
|---|---|---|---|---|---|---|
| MeOH | argon | 1.32 | 27.5 | 88 | 116 | 494.2–513.9 |
| $MeOH/H_2O$ | argon | 2.1 | 26.8 | 368 | 773 | 497.2–413.9 |
| $MeOH/H_2O$ | air | 1.5 | 28.2 | 174 | 262 | 496.4–512.8 |
| MeOH | air | 0.83 | 32.7 | 73 | 61 | 494.2–511.7 |
| EtOH | argon | 1.12 | 25.3 | 32.8 | nd | 495.3–512.8 |
| $H_2O$ | air | 1.31 | 27.8 | 155.0 | nd | 495.3–514.9 |
| $H_2O$ | argon | 1.72 | 26.7 | 303.0 | nd | 495.2–518.2 |
| $EtOH/H_2O$ | argon | 2.05 | 27.6 | 213.0 | nd | 495.3–514.9 |
| Ethylene-glycol/$H_2O$ | argon | 1.82 | 27.1 | 309 | nd | 497.5–514.9 |
| $H_2O$ | air | 1.11 | 27.3 | 410.0[a] | nd | nd |

[a]More dye added

TABLE II

| SOLVENT | COVER GAS | LASING SLOPE EFFICIENCY $k_o \times 10^3$ | LASING THRESHOLD $t_O$ (J) | LIFETIME CONSTANT 1/c (MJ/L) | FIGURE OF MERIT (KJ/L) | LASING WAVELENGTHS (nm) |
|---|---|---|---|---|---|---|
| LASING DATA FOR 4-{2-(5-[4-CHLOROPHENYL]}OXAZOLYL)-1-METHYLPYRIDINIUM P—TOLUENESULFONATE | | | | | | |
| $H_2O$ | argon | 0.60 | 32.7 | 197 | 118 | 509.5–523.7 |
| EtOH | argon | 0.46 | 34.2 | 53 | 24 | 508.4–520.4 |

TABLE III

| SOLVENT | COVER GAS | LASING SLOPE EFFICIENCY $k_o \times 10^3$ | LASING THRESHOLD $t_O$ (J) | LIFETIME CONSTANT 1/c (MJ/L) | FIGURE OF MERIT (KJ/L) | LASING WAVELENGTHS (nm) |
|---|---|---|---|---|---|---|
| LASING DATA FOR 4-{2-(5-[METHOXYPHENYL]}OXAZOLYL)-1-METHYLPYRIDINIUM P—TOLUENESULFONATE | | | | | | |
| EtOH/$H_2O$ | air | 1.63 | 26.3 | 424 | 691 | 570.0–589.5 |

What is claimed is:

1. As a composition of matter, the compound having a formula as follows:

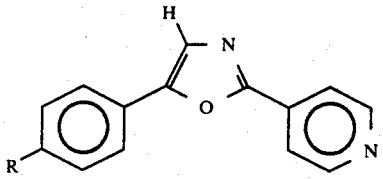

where R is selected from the group consisting of F and Cl.

2. As a composition of matter, the compound having a formula as follows:

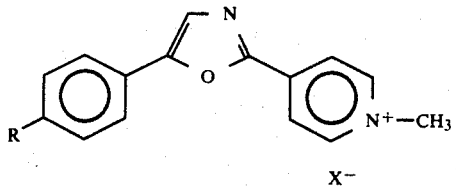

where R is selected from the group consisting of F and Cl; and X is selected from the group consisting of $ClO_4$-, $BF_4$-, and

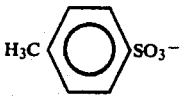

3. A method of producing coherent laser emission in the operation of a dye laser comprising the steps of optically pumping a dye solution to produce a population inversion of radiation therefrom, the solution containing about $10^{-5}$ to about $10^{-1}$ molar concentration of a lasing dye in a non-intefering solvent selected from the group consisting of $H_2O$, ethanol and mixtures thereof, the dye having a formula as follows:

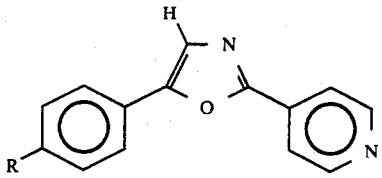

wherein R is selected from the group consisting of F and Cl.

4. A method of producing coherent laser emission in the operation of a dye laser comprising the steps of optically pumping a dye solution to produce a population inversion of radiation therefrom, the solution containing about $10^{-5}$ to about $10^{-1}$ molar concentration of a lasing dye in a non-interfering solvent selected from the group consisting of $H_2O$, ethanol and mixtures thereof, the dye having a formula as follows:

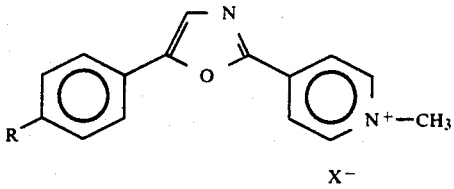

wherein R is selected from the group consisting of F and Cl; and X is selected from the group consisting of $ClO_4$-, $BF_4$-, and

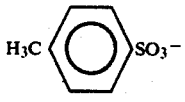

* * * * *